(12) United States Patent
Oikawa et al.

(10) Patent No.: US 11,190,069 B2
(45) Date of Patent: Nov. 30, 2021

(54) CONSEQUENT-POLE-TYPE ROTOR, ELECTRIC MOTOR, AND AIR CONDITIONER

(71) Applicant: Mitsubishi Electric Corporation, Tokyo (JP)

(72) Inventors: Tomoaki Oikawa, Tokyo (JP); Mineo Yamamoto, Tokyo (JP); Hiroyuki Ishii, Tokyo (JP); Hiroki Aso, Tokyo (JP); Junichiro Oya, Tokyo (JP); Yuto Urabe, Tokyo (JP)

(73) Assignee: Mitsubishi Elextric Corporation, Tokyo (JP)

( * ) Notice: Subject to any disclaimer, the term of this patent is extended or adjusted under 35 U.S.C. 154(b) by 299 days.

(21) Appl. No.: 16/099,073

(22) PCT Filed: Jun. 22, 2016

(86) PCT No.: PCT/JP2016/068489
§ 371 (c)(1),
(2) Date: Nov. 5, 2018

(87) PCT Pub. No.: WO2017/221341
PCT Pub. Date: Dec. 28, 2017

(65) Prior Publication Data
US 2019/0199149 A1    Jun. 27, 2019

(51) Int. Cl.
*H02K 1/27*    (2006.01)
*H02K 5/173*    (2006.01)
(Continued)

(52) U.S. Cl.
CPC ........... *H02K 1/2766* (2013.01); *H02K 1/146* (2013.01); *H02K 1/148* (2013.01); *H02K 1/27* (2013.01);
(Continued)

(58) Field of Classification Search
CPC .... H02K 1/2766; H02K 11/215; H02K 11/38; H02K 1/146; H02K 1/148; H02K 1/27;
(Continued)

(56) References Cited

U.S. PATENT DOCUMENTS

| 5,679,995 A | 10/1997 | Nagate et al. |
| 5,864,191 A | 1/1999 | Nagate et al. |

(Continued)

FOREIGN PATENT DOCUMENTS

| DE | 10 2014 226 171 A1 | 6/2016 |
| JP | H04-156243 A | 5/1992 |

(Continued)

OTHER PUBLICATIONS

Office Action dated May 21, 2019 issued in corresponding JP patent application No. 2018-523204 (and English translation).

(Continued)

*Primary Examiner* — Jianchun Qin
(74) *Attorney, Agent, or Firm* — Posz Law Group, PLC

(57) ABSTRACT

A consequent-pole-type rotor includes a first rotor core having a first insertion hole, and a second rotor core having a second insertion hole, the second rotor core being stacked on the first rotor core such that the first insertion hole and the second insertion hole together form a space accommodating a permanent magnet. The first insertion hole has an opening at a first circumferential position of the first rotor core, and the second insertion hole is occluded at least at a second circumferential position of the second rotor core. The second circumferential position corresponds to the first circumferential position.

7 Claims, 14 Drawing Sheets

(51) Int. Cl.
    *H02K 7/00*    (2006.01)
    *H02K 21/14*   (2006.01)
    *H02K 11/38*   (2016.01)
    *H02K 5/08*    (2006.01)
    *H02K 11/215*  (2016.01)
    *H02K 1/14*    (2006.01)

(52) U.S. Cl.
    CPC .............. *H02K 1/276* (2013.01); *H02K 5/08* (2013.01); *H02K 5/1732* (2013.01); *H02K 7/003* (2013.01); *H02K 11/215* (2016.01); *H02K 11/38* (2016.01); *H02K 21/14* (2013.01); *H02K 2211/03* (2013.01)

(58) Field of Classification Search
    CPC ........ H02K 1/276; H02K 5/08; H02K 5/1732; H02K 7/003; H02K 21/14; H02K 2211/03
    See application file for complete search history.

(56) References Cited

U.S. PATENT DOCUMENTS

| | | | |
|---|---|---|---|
| 9,502,931 B2* | 11/2016 | Yamada | H02K 1/2746 |
| 9,941,775 B2* | 4/2018 | Fiseni | H02K 3/20 |
| 2011/0127859 A1* | 6/2011 | Amrhein | H02K 1/276 310/43 |
| 2013/0234555 A1* | 9/2013 | Takizawa | H02K 1/2773 310/156.15 |
| 2013/0313938 A1 | 11/2013 | Kamada et al. | |
| 2014/0117791 A1 | 5/2014 | Fiseni et al. | |

FOREIGN PATENT DOCUMENTS

| | | |
|---|---|---|
| JP | 2012-050274 A | 3/2012 |
| JP | 2012-085433 A | 4/2012 |
| JP | 2012-244783 A | 12/2012 |
| WO | 94/05075 A1 | 3/1994 |
| WO | 00/62399 A2 | 10/2000 |

OTHER PUBLICATIONS

Office Action dated Apr. 7, 2020 issued in corresponding Korean patent application No. 10-2018-7033863 (and partial English translation).
Office Action dated Oct. 15, 2019 issued in corresponding KR patent application No. 10-2018-7033863 (and English translation).
Office Action dated Sep. 27, 2020 issued in corresponding CN patent application No. 201680086016.6 (and English translation).
Office Action dated Dec. 31, 2019 issued in corresponding CN patent application No. 201680086016.6 (and English translation).
International Search Report of the International Searching Authority dated Sep. 6, 2016 for the corresponding International application No. PCT/JP2016/068489 (and English translation).
Office Action dated Jul. 5, 2021, issued in corresponding Great Britain Patent Application No. GB1818390.5.
Office Action dated Jun. 2, 2021, issued in corresponding CN Patent Application No. 201680086016.6 (and English translation).
Office Action dated Oct. 4, 2021, issued in corresponding Great Britain Patent Application No. GB1818390.5.

* cited by examiner

CONSEQUENT-POLE-TYPE ROTOR, ELECTRIC MOTOR, AND AIR CONDITIONER

CROSS REFERENCE TO RELATED APPLICATION

This application is a U.S. national stage application of International Patent Application No. PCT/JP2016/068489 filed on Jun. 22, 2016, the disclosure of which is incorporated herein by reference.

TECHNICAL FIELD

The present invention relates to a consequent-pole-type rotor, an electric motor, and an air conditioner.

BACKGROUND

Conventionally, rare-earth magnets having high energy densities such as neodymium sintered magnets have generally been used for permanent magnets of electric motors mounted in compressors of air conditioners in order to improve energy-saving performance of the air conditioners. Electric motors using neodymium sintered magnets have been developed for fans of air conditioners.

Such permanent magnets are expensive because the permanent magnets contain precious rare-earth elements. Therefore, there is a strong demand for cost reduction by reducing the usage amount and processing cost of permanent magnets.

In general, permanent magnets are made by cutting a block into a specified shape. Therefore, as the number of permanent magnets used in an electric motor increases, the processing cost increases.

As a method of reducing the number of permanent magnets used in an electric motor, there is a method of forming a rotor with so-called consequent poles. In a consequent-pole-type rotor disclosed in Patent Literature 1, magnet magnetic poles produced by permanent magnets and salient poles not produced by permanent magnets but formed in a core material are alternately arrayed in the circumferential direction. Therefore, the number of the magnet magnetic poles and the number of the salient poles are each half the number of the poles. In addition, the magnet magnetic poles whose number is half the number of the poles have the same polarity, and the salient poles whose number is half the number of the poles have a polarity different from a polarity of the magnet magnetic poles. Thus, in the consequent-pole-type rotor, the number of the permanent magnets is half the usual number. However, in the consequent-pole-type rotor, the inductance differs between the magnet magnetic poles and the salient poles, and there is a problem that vibration and noise become large due to the inductance imbalance.

To this problem, Patent Literature 1 contrives a shape of flux barriers at both ends of each permanent magnet in the consequent-pole-type rotor, thereby to improve inductance asymmetry to reduce vibration and noise. The flux barriers are cavities formed in both circumferential ends of each magnet insertion hole, and are formed with the permanent magnet disposed in the magnet insertion hole.

PATENT LITERATURE

Patent Literature 1: Japanese Patent Application Laid-open No. 2012-244783

The number of magnets in the consequent-pole-type rotor is half that of a common IPM-type rotor using a number of permanent magnets corresponding to the total number of poles. Consequently, in the consequent-pole-type rotor, the circumferential width of a bridge existing between adjacent permanent magnets relatively increases, and the bridge becomes hard to saturate with magnetic flux. Therefore, magnetic resistance by the bridge is smaller than magnetic resistance of a common IPM-type rotor. As a result, in the consequent-pole-type rotor, leakage flux produced at one pole of the N pole and the S pole of a permanent magnet flows through the bridge to the other pole of the N pole and the S pole of the permanent magnet, causing a decrease in induced voltage due to the flux leakage.

In order to solve such a problem, by reducing the radial thickness of a thin-walled bridge formed between a flux barrier and an outer peripheral surface of a rotor core, the magnetic resistance of the thin-walled bridge can be increased to reduce flux leakage. However, in the conventional consequent-pole rotor disclosed in Patent Literature 1, a rotor core is manufactured by core pressing, and thus there is a limit to the reduction of the thickness of a thin-walled bridge to facilitate magnetic flux saturation thereof. In a small electric motor, in particular, it is difficult to reduce the thickness of a thin-walled bridge, and thus there is a problem that the flux leakage rate increases and efficiency decreases.

SUMMARY

The present invention has been made in view of the above, and an object of the present invention is to obtain a consequent-pole-type rotor that improves efficiency by reducing a reduction in magnetic force due to flux leakage while reducing manufacturing cost.

In order to solve the above-described problems and achieve the object, a consequent-pole-type rotor of the present invention includes a first rotor core having a first insertion hole and a second rotor core having a second insertion hole. The second rotor core is stacked on the first rotor core such that the first insertion hole and the second insertion hole together form a space accommodating a permanent magnet. The first insertion hole has an opening at a first circumferential position of the first rotor core, the second insertion hole is occluded at least at a second circumferential position of the second rotor core, and the second circumferential position corresponds to the first circumferential position.

The consequent-pole-type rotor according to the present invention has an effect that it is possible to improve efficiency by reducing a reduction in magnetic force due to flux leakage while reducing manufacturing cost.

DETAILED DESCRIPTION

Hereinafter, a consequent-pole-type rotor, an electric motor, and an air conditioner according to embodiments of the present invention will be described in detail with reference to the drawings. Note that the invention is not limited to the embodiments.

First Embodiment

Figure 1:
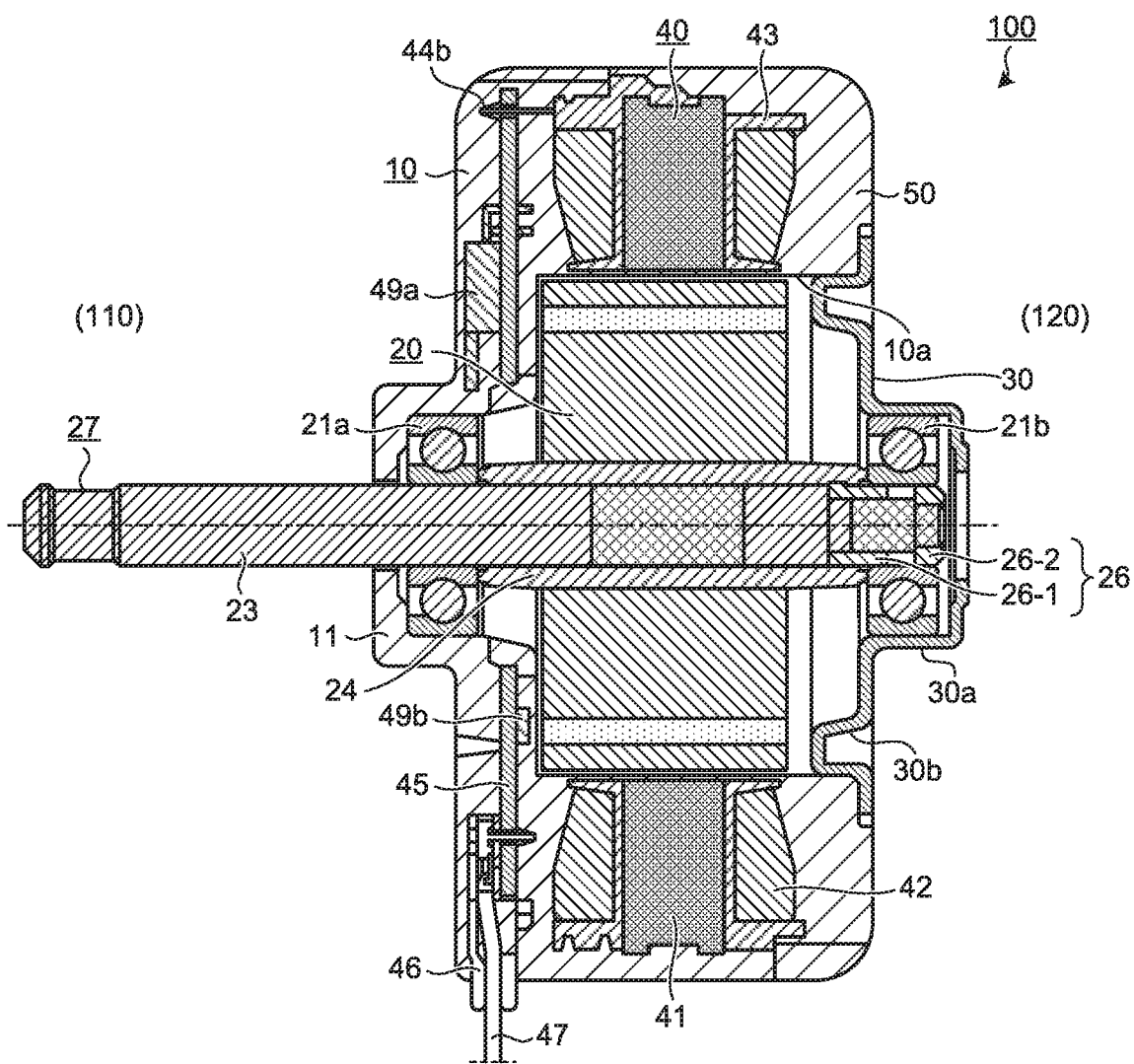
FIG. 1 is a side cross-sectional view of an electric motor according to a first embodiment.

FIG. 1 is a side cross-sectional view of an electric motor according to a first embodiment. An electric motor 100 illustrated in FIG. 1 includes a molded stator 10, a rotor 20, and a metal bracket 30 attached to one axial end portion of the molded stator 10. The electric motor 100 is a brushless DC motor that includes permanent magnets in the rotor 20 and is driven by an inverter. The rotor 20 is of an internal magnet type and is of a consequent-pole type.

The molded stator 10 includes a stator 40 and a mold resin 50 covering the stator 40. The axial direction of the molded stator 10 coincides with the axial direction of a shaft 23 of the rotor 20. FIG. 1 illustrates, as components of the stator 40, a stator core 41, a coil 42 wound around the stator core 41, an insulating portion 43 provided at the stator core 41, and a neutral terminal 44b provided at the insulating portion 43, details of which will be described in sequence.

FIG. 1 also illustrates a substrate 45 attached to the insulating portion 43, a lead exit part 46 assembled to the substrate 45, a lead 47 exiting from the lead exit part 46, an Integrated Circuit (IC) 49a mounted on the substrate 45, and a hall IC 49b mounted on a surface of the substrate 45 on the rotor 20 side.

The rotor 20 includes a shaft assembly 27, a resin portion 24 that integrates the rotor 20 body and the shaft assembly 27, a load-side rolling bearing 21a that is mounted on the shaft 23 and supported by a bearing support 11 of the molded stator 10, and an opposite-to-load-side rolling bearing 21b that is mounted on the shaft 23 and supported by the bracket 30. A load side 110 represents the side of an end face of both end faces of the electric motor 100, from which the shaft 23 projects, and an opposite-to-load side 120 represents the side of an end face at which the bracket 30 is provided.

The shaft assembly 27 includes an insulating sleeve 26 consisting of a pair of insulating sleeves 26-1 and 26-2. The insulating sleeve 26 is disposed between the opposite-to-load-side rolling bearing 21b and the shaft 23.

Figure 2:
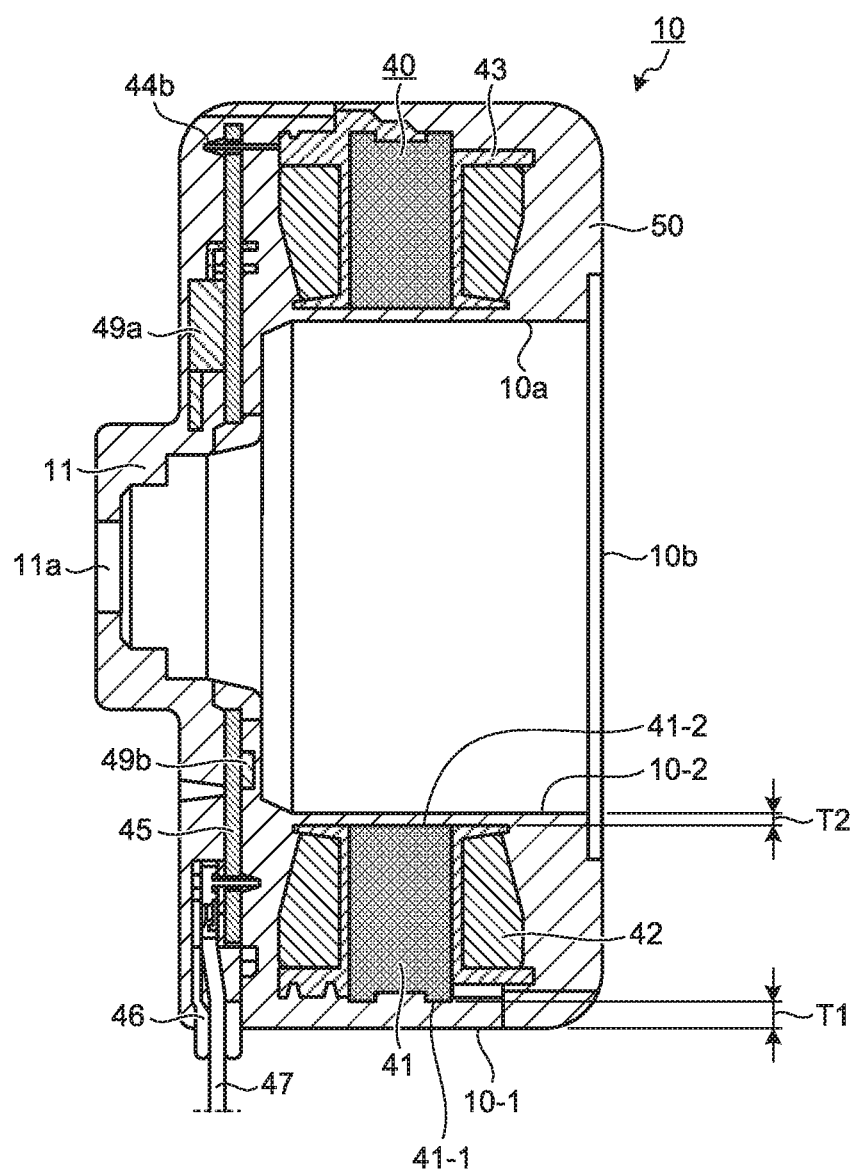
FIG. 2 is a side cross-sectional view of a molded stator illustrated in FIG. 1.

FIG. 2 is a side cross-sectional view of the molded stator illustrated in FIG. 1. In FIG. 2, the same reference numerals are assigned to the same components as those in FIG. 1. The molded stator 10 has an opening 10b formed in one axial end portion of the molded stator 10. The rotor 20 is inserted into the opening 10b. In an axial end portion of the molded stator 10 in which the load-side rolling bearing 21a of the rotor 20 inserted into the opening 10b is fitted, a hole 11a larger than the diameter of the shaft assembly 27 of the rotor 20 illustrated in FIG. 1 is formed. The other configuration of the molded stator 10 will be described later.

Figure 3:
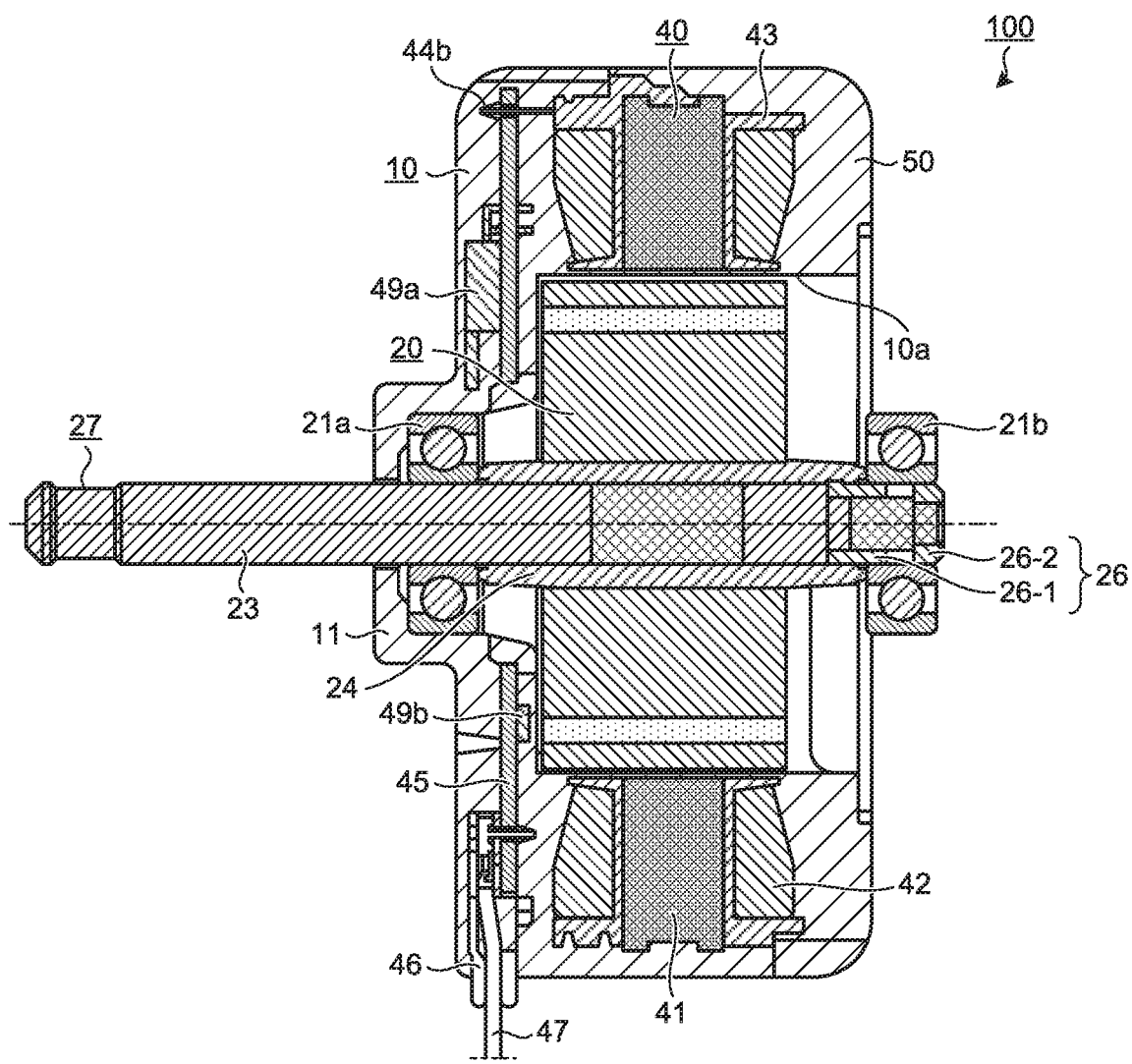
FIG. 3 is a side cross-sectional view illustrating a state in which a rotor is inserted in the molded stator illustrated in FIG. 2.

FIG. 3 is a side cross-sectional view illustrating a state in which the rotor is inserted in the molded stator illustrated in FIG. 2. In FIG. 3, the same reference numerals are assigned to the same components as those in FIG. 1. The rotor 20 inserted through the opening 10b of the molded stator 10 illustrated in FIG. 2 is disposed such that the load side of the shaft assembly 27 is drawn out to the outside of the molded stator 10 through the hole 11a illustrated in FIG. 2. At this time, the load-side rolling bearing 21a mounted on the shaft 23 is pressed until the load-side rolling bearing 21a abuts on the bearing support 11 of the molded stator 10, and is supported by the bearing support 11. The bearing support 11 is an axial end portion of the molded stator 10, and is provided opposite to the opening 10b.

On the opposite-to-load side of the shaft assembly 27, the opposite-to-load-side rolling bearing 21b is mounted. The mounting of the opposite-to-load-side rolling bearing 21b is generally by press fitting. The insulating sleeve 26 integrally molded with and formed on the shaft 23 is provided between the opposite-to-load-side rolling bearing 21b and the opposite-to-load side of the shaft 23, which will be described in detail later.

Figure 4:
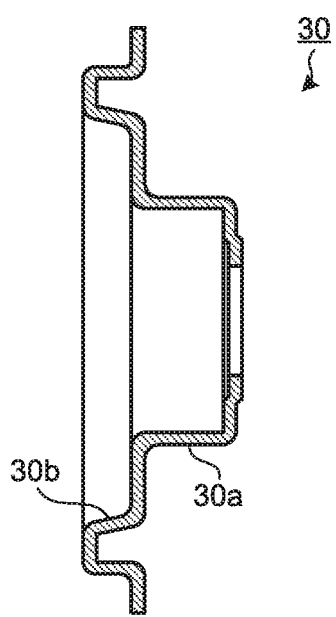
FIG. 4 is a side cross-sectional view of a bracket illustrated in FIG. 1.

FIG. 4 is a side cross-sectional view of the bracket illustrated in FIG. 1. The bracket 30 closes the opening 10b of the molded stator 10 and supports the opposite-to-load-side rolling bearing 21b, and is press-fitted into the molded stator 10. The bracket 30 includes a bearing support 30a and a press-fitted portion 30b integrally formed with the bearing support 30a. The bearing support 30a supports the opposite-to-load-side rolling bearing 21b. The press-fitted portion 30b has a ring shape.

The attachment of the bracket 30 to the molded stator 10 is performed by press-fitting the press-fitted portion 30b into the opening 10b side of an inner peripheral portion 10a of the molded stator 10. The outer diameter of the press-fitted portion 30b is larger than the inner diameter of the inner peripheral portion 10a of the molded stator 10 by a margin for press fitting. The bracket 30 is made of a metal having conductivity, and is formed of, for example, a galvanized steel sheet. However, the bracket 30 can also be formed of a material other than a galvanized steel sheet. The material of the bracket 30 can be exemplified by an aluminum alloy, an austenitic stainless alloy, a copper alloy, cast iron, steel, or an iron alloy.

The configuration of the molded stator 10 will be described below. The molded stator 10 illustrated in FIG. 2 includes the stator 40 and the mold resin 50 for molding. An unsaturated polyester resin is used for the mold resin 50. Bulk Molding Compound (BMC) with various additives added to an unsaturated polyester resin is particularly desirable for an electric motor. For example, thermoplastic resins such as PolyButylene Terephthalate (PBT) and Poly Phenylene Sulfide (PPS) have a better side because runners during molding can be recycled.

However, unsaturated polyester resins and BMC excel in providing dimensional accuracy because the unsaturated polyester resins and BMC have linear expansion coefficients close to linear expansion coefficients of iron-based materials such as the stator core 41, the load-side rolling bearing 21a, and the opposite-to-load-side rolling bearing 21b, and have heat shrinkage percentages of 1/10 or less of heat shrinkage percentages of thermoplastic resins.

In addition, as compared with the case where an outer shell of the electric motor 100 is formed of a metal such as iron or aluminum, an outer shell of the electric motor 100 formed of an unsaturated polyester resin and BMC has better heat dispersion characteristics. In addition, when an outer shell of the electric motor 100 is formed of a metal, the metal forming the outer shell of the electric motor 100 is separated from the coil 42 and the substrate 45 due to insulation problem. By contrast, the unsaturated polyester resin and BMC are insulators and thus present no insulation problem even when covering the coil 42 and the substrate 45, and have high thermal conductivities and thus have excellent heat dispersion characteristics, contributing to higher output power of the electric motor 100.

The load-side rolling bearing 21a is supported by the bearing support 11 formed of the mold resin 50, and the opposite-to-load-side rolling bearing 21b and the bracket 30 are supported by the inner peripheral portion 10a formed of the mold resin 50. Therefore, if the dimensional accuracy of the mold resin 50 is poor, the axis of the rotor 20 and the axis of the stator 40 are misaligned, causing vibration and noise. However, using the unsaturated polyester resin and BMC having small heat shrinkage percentages facilitates the provision of dimensional accuracy after molding.

In addition, using a resin having a large linear expansion coefficient may cause a problem that the bearings rattle when the temperature of the electric motor 100 becomes high. The unsaturated polyester resin and BMC, whose linear expansion coefficients are close to the linear expansion coefficients of iron-based materials such as the stator core 41, the load-side rolling bearing 21a, and the opposite-to-load-side rolling bearing 21b, thus can prevent misalignment between the axis of the rotor 20 and the axis of the stator 40, irrespective of the temperature of the electric motor 100.

Further, the unsaturated polyester resin and BMC constrain the stator 40 when cured, and thus can prevent deformation of the stator 40 due to the exciting force of the electric motor 100, and can suppress vibration and noise.

Figure 5:
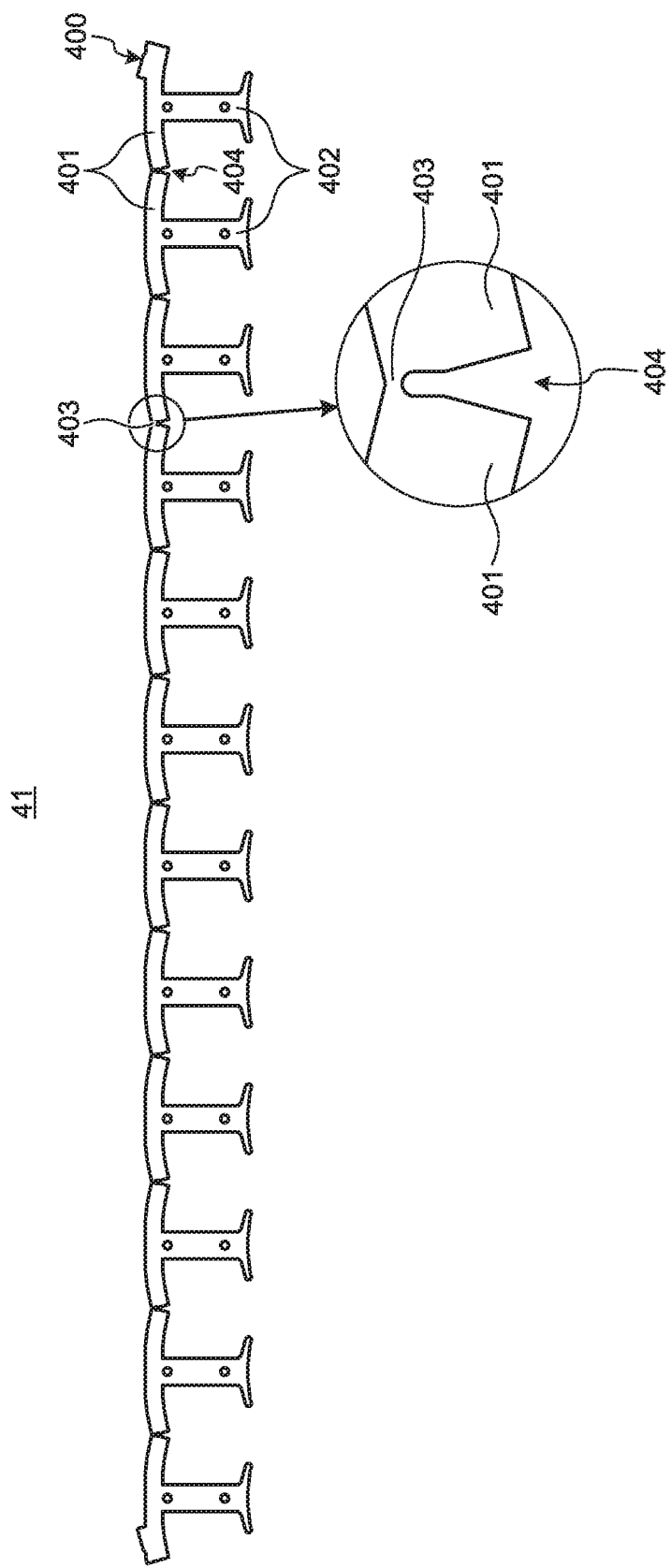
FIG. 5 is a configuration diagram of a stator core composed of a plurality of core segments and developed in a strip.

FIG. 5 is a configuration diagram of the stator core composed of a plurality of core segments and developed in a strip. The stator core 41 illustrated in FIG. 5 has a plurality of core segments 400 arrayed such that each of the plurality of core segments 400 is in contact with another adjacent one of the plurality of core segments 400. Each of the plurality of core segments 400 has a back yoke 401 and a tooth 402 projecting from the back yoke 401. A thin-walled portion 403 connecting adjacent back yokes 401 is provided between the back yokes 401.

Figure 6:
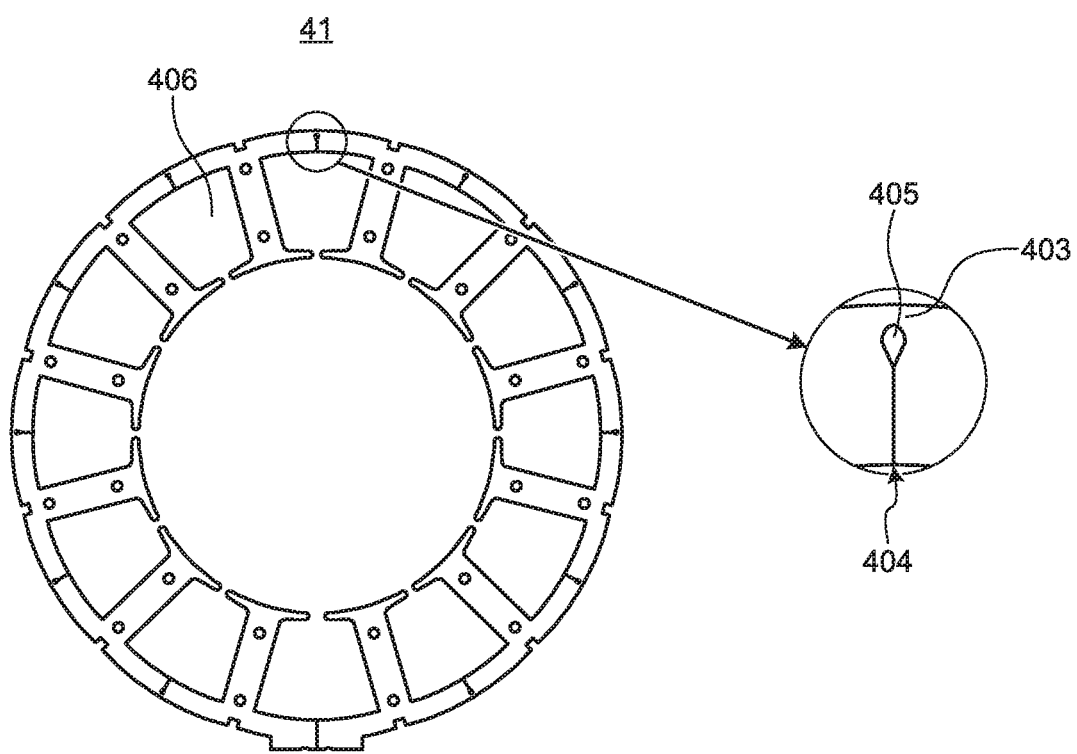
FIG. 6 is a diagram illustrating a state in which the developed stator core illustrated in FIG. 5 is bent into an annular shape.

FIG. 6 is a diagram illustrating a state in which the developed stator core illustrated in FIG. 5 is bent into an annular shape. The annular stator core 41 illustrated in FIG. 6 is formed by providing the coil 42 in FIG. 1 to each of the plurality of teeth 402 illustrated in FIG. 5, and then bending a core segment 400 group in a strip at the thin-walled portions 403 into an annular shape.

As illustrated in FIGS. 5 and 6, the stator core 41 composed of the plurality of core segments 400 allows the coil 42 to be wound thereon in a state of being developed in a strip, and thus enables densification of the coil 42 and is effective for increased efficiency. However, since the core segments 400 are connected by the thin-walled portions 403, the stator core 41 has a low rigidity when formed in an annular shape. For those having large exciting force like the consequent-pole-type electric motor 100, it is effective to mold the stator core 41 with an unsaturated polyester resin, that is, cover the stator core 41 with an unsaturated polyester resin.

Other than the structure in which the adjacent back yokes 401 are connected to each other by the thin-walled portions 403 as in FIG. 5, the stator core 41 composed of the plurality of core segments 400 may be of a structure in which dowels in recessed and projecting shapes are formed at end portions of each back yoke 401, and the dowels are connected to each other, or may be of a structure in which the back yokes 401 separated from each other are fixed by welding or fitting together. By covering the stator core thus configured with an unsaturated polyester resin, vibration and noise can be reduced.

It is desirable to completely cover the stator core with an unsaturated polyester resin in this manner. As illustrated in FIG. 2, it is desirable that the molded stator 10 is configured to satisfy a relationship of T1>T2 where T1 is the thickness from an outer peripheral portion 41-1 of the stator core 41 to an outer peripheral portion 10-1 of the unsaturated polyester resin, and T2 is the thickness from an inner peripheral portion 41-2 of the stator core 41 to an inner peripheral portion 10-2 of the unsaturated polyester resin.

If the thickness T2 is made too large, the diameter of the rotor 20 must be reduced, and the magnetic gap between the stator core 41 and the rotor 20 becomes large, degrading electric motor characteristics. Therefore, in the molded stator 10 according to the present embodiment, by making the thickness T1 larger than the thickness T2, the rigidity of the thickness T1 on an outer side in the radial direction is increased. The term "radial direction" indicates the radial direction of the rotor 20.

If the axis of the rotor 20 and the axis of the stator 40 are misaligned, causing imbalance in the gap between the stator core 41 and the rotor 20, an exciting force due to eccentricity is added. Therefore, eccentricity should be minimized as much as possible in assemblage. As the thickness T2 increases, a corresponding imbalance tends to occur in the gap. Thus, it is effective to set the thickness T2 to zero.

However, in that case, spaces between the adjacent teeth 402 of the stator core 41 are filled with the unsaturated polyester resin up to the teeth tips. Exciting force includes a force shaking the teeth tips to the left and right. Thus, completely filling the spaces between the teeth leads to the reduction of the influence of this force.

For the stator core 41 illustrated in FIGS. 5 and 6, by providing the unsaturated polyester resin to split surfaces 404 between the adjacent core segments 400, the influence of exciting force acting on the teeth 402 can be reduced.

Therefore, in the stator core 41, holes 405 are formed in the split surfaces 404 of the annular stator core 41 illustrated in FIG. 6. Each hole 405 is formed by providing a groove or a notch between the adjacent back yokes 401. When unsaturated polyester is molded on the annular stator core 41, the holes 405 are filled with unsaturated polyester resin. The holes 405 need not be filled with unsaturated polyester in the entire area from one axial end face to the other axial end face of the stator core 41, and only need to be filled slightly from one axial end face of the stator core 41. In this case also, an effect of attenuating vibration can be expected. As the holes 405 are made larger in order to increase the filling amount, the holes 405 have magnetically more adverse effects. Therefore, the filling amount is determined appropriately. The holes 405 in the split surfaces 404 may have a groove shape open to the outer peripheral surface of the stator core 41, or a groove shape open to the slot 406 side, to provide the same effect.

Next, the configuration of the rotor will be described. Hereinafter, with reference to FIGS. 7 and 8, the configuration of a rotor with all magnetic poles formed by permanent magnets will be described, and with reference to FIGS. 9 and 10, a common consequent-pole-type rotor will be described.

Figure 7:
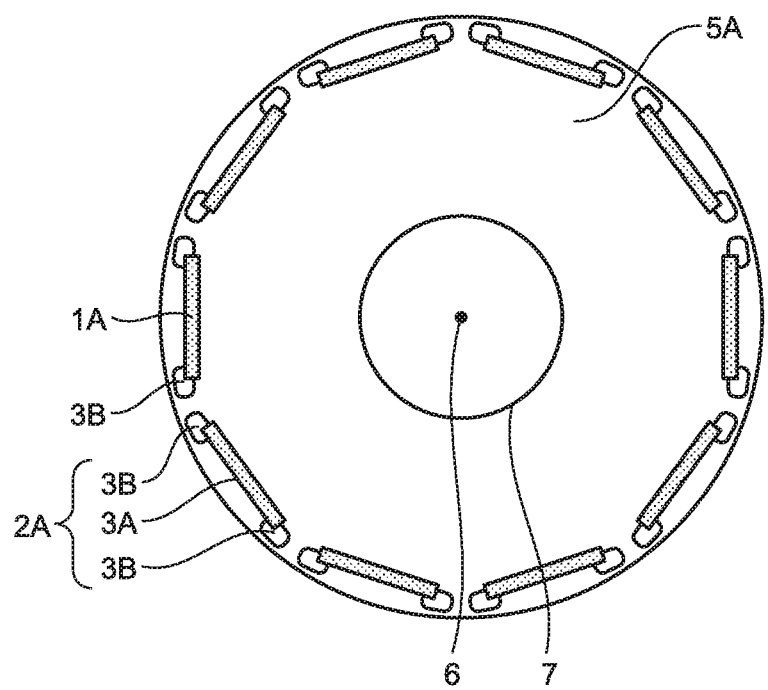
FIG. 7 is a cross-sectional view of a rotor with all magnetic poles formed by permanent magnets.
Figure 8:
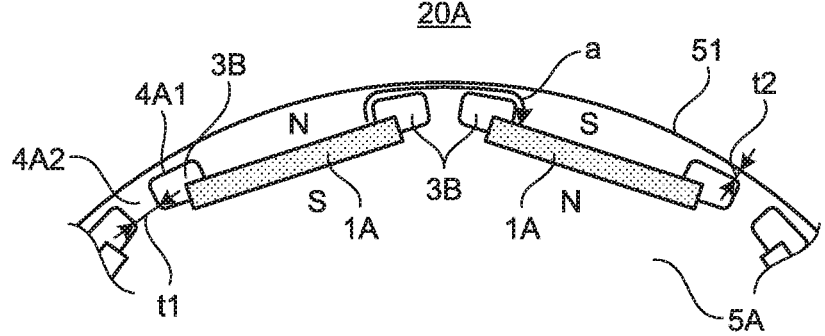
FIG. 8 is a partially enlarged view of the rotor illustrated in FIG. 7.

FIG. 7 is a cross-sectional view of a rotor with all magnetic poles formed by permanent magnets. FIG. 8 is a partially enlarged view of the rotor illustrated in FIG. 7. A rotor 20A illustrated in FIG. 7 includes an annular rotor core 5A, ten magnet insertion holes 2A formed in the circumferential direction of the rotor core 5A, and ten permanent magnets 1A disposed in the ten magnet insertion holes 2A, individually. The term "circumferential direction" indicates the circumferential direction of the rotor 20A.

The rotor core 5A is made of a core material that is a soft magnetic material, and is formed by stacking a plurality of electromagnetic steel sheets. The permanent magnets 1A are rare earth magnets of a rectangular cross-section flat shape, and are neodymium sintered magnets whose main component is neodymium (Nd)-iron (Fe)-boron (B).

Each magnet insertion hole 2A is composed of a rectangular first region 3A into which the permanent magnet 1A is inserted, and two second regions 3B into which the permanent magnet 1A is not inserted. The second regions 3B are formed at longitudinal both ends of the first region 3A, one at a place. The second regions 3B have the function of flux barriers for suppressing leakage flux against the permanent magnet 1A inserted in the first region 3A, and have the function of making magnetic flux density distribution over an outer peripheral surface 51 of the rotor core 5A close to a sinusoidal wave to short-circuit magnetic flux of the permanent magnets 1A inserted in the adjacent magnet insertion holes 2A via the rotor core 5A.

The ten magnet insertion holes 2A are arrayed at equal intervals in the circumferential direction of the rotor core 5A, and are arranged equidistantly from a rotation axis 6. Adjacent magnet insertion holes 2A are spaced. The rotation axis 6 coincides with the axis of the rotor core 5A. The magnet insertion holes 2A are formed near the outer peripheral surface 51 of the rotor core 5A, and extend through the rotor core 5A in the axial direction.

The rotor core 5A includes bridges 4A1 and bridges 4A2. Each bridge 4A1 is formed between the radially outer side of the second region 3B of the magnet insertion hole 2A and the outer peripheral surface 51 of the rotor core 5A, and each bridge 4A2 is formed between the second region 3B of the magnet insertion hole 2A and the second region 3B of the adjacent magnet insertion hole 2A. The rotor core 5A has a shaft insertion hole 7 at the center.

As illustrated in FIG. 8, in the rotor core 5A, a radial thickness t1 of the bridge 4A2 is equal to a circumferential thickness t2 of the bridge 4A1, or is slightly larger than the circumferential thickness t2 of the bridge 4A1.

In the rotor core 5A, magnetic poles of an N pole and an S pole are aligned on the radially outer side of adjacent permanent magnets 1A, that is, on the outer peripheral surface 51 side. Consequently, leakage flux a flows from one N pole to the other S pole. At this time, in the rotor 20A, the bridge 4A1 and the bridges 4A2 impart magnetic resistance, thus reducing the amount of leakage flux.

Figure 9:
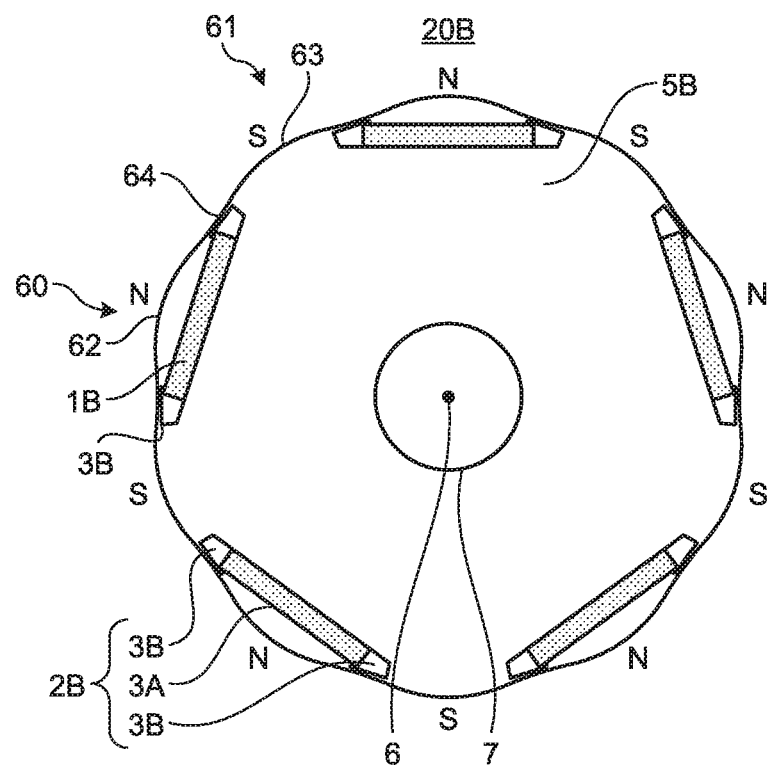
FIG. 9 is a cross-sectional view of a common consequent-pole-type rotor.
Figure 10:
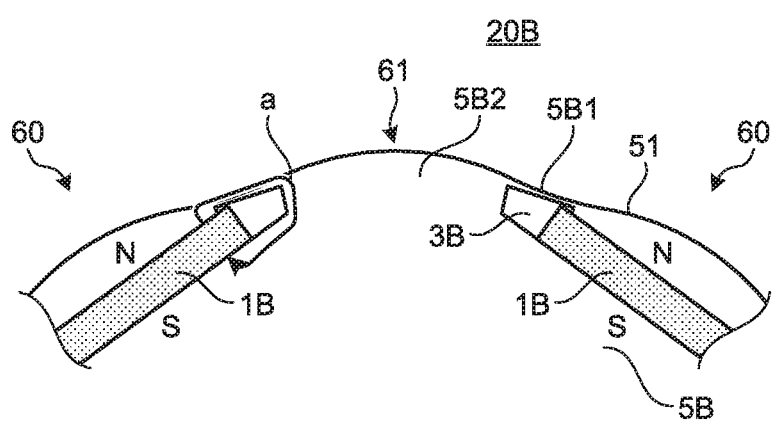
FIG. 10 is a partially enlarged view of the rotor illustrated in FIG. 9.

FIG. 9 is a cross-sectional view of a common consequent-pole-type rotor. FIG. 10 is a partially enlarged view of the rotor illustrated in FIG. 9. A rotor 20B illustrated in FIG. 9 includes an annular rotor core 5B and five magnet insertion holes 2B arrayed in the circumferential direction. The number of the magnet insertion holes 2B is half the number of poles of the rotor 20B. The five magnet insertion holes 2B are arrayed at equal intervals in the circumferential direction. The five magnet insertion holes 2B are arranged equidistantly from a rotation axis 6. The rotation axis 6 coincides with the axis of the rotor core 5B. The five magnet insertion holes 2B extend through the rotor core 5B in the axial direction. The magnet insertion holes 2B are formed near an outer peripheral surface 51 of the rotor core 5B, and extend in the circumferential direction. Adjacent magnet insertion holes 2B are spaced. The rotor core 5B has a shaft insertion hole 7 at the center.

The rotor core 5B is made of a core material that is a soft magnetic material, specifically, is formed by stacking a plurality of electromagnetic steel sheets. The thickness of the electromagnetic steel sheets is generally from 0.1 mm to 0.7 mm.

Five permanent magnets 1B are inserted into the five magnet insertion holes 2B, individually. The permanent magnets 1B have a flat shape with a rectangular cross section, for example. The thickness of each permanent magnet 1B is 2 mm, for example. The permanent magnets 1B are rare earth magnets, and are neodymium sintered magnets whose main component is neodymium (Nd)-iron (Fe)-boron (B).

Each magnet insertion hole 2B is composed of a rectangular first region 3A into which the permanent magnet 1B is inserted and two second regions 3B into which the permanent magnet 1B is not inserted. The second regions 3B are formed at longitudinal both ends of the first region 3A, one at a place. The second regions 3B have the function of flux barriers for suppressing leakage flux a against the permanent magnet 1B inserted in the first region 3A, and have the function of making magnetic flux density distribution over the outer peripheral surface 51 of the rotor core 5B close to a sinusoidal wave to short-circuit magnetic flux of the permanent magnets 1B inserted in the adjacent magnet insertion holes 2B via the rotor core 5B.

The rotor 20B has ten magnetic poles arrayed such that the polarities alternate at the outer peripheral surface 51 of the rotor core 5B in the circumferential direction. Specifically, the rotor 20B has five first magnetic poles that are formed by the five permanent magnets 1B, individually, and have the same polarity, and five second magnetic poles each of which is formed in the rotor core 5B between the permanent magnets 1B adjacent to each other and has a polarity different from a polarity of the first magnetic poles. In the illustrated example, the first magnetic poles are N poles and the second magnetic poles are S poles, but the poles may be reversed. The ten magnetic poles of the rotor 20B are arranged at equal angular intervals in the circumferential direction with a pole pitch of 360 degrees/10=36 degrees.

Thus, in the consequent-pole-type rotor 20B, the five permanent magnets 1B, which are half the number of the poles, provide the five first magnetic poles, individually. Further, the five second magnetic poles, which are half the number of the poles, are each formed in the core material of the rotor core 5B between the permanent magnets 1B adjacent to each other. The second magnetic poles are so-called salient poles, and are formed by magnetizing the rotor 20B.

Therefore, in the rotor 20B, first magnetic pole portions 60 that are magnet magnetic pole portions including the permanent magnets 1B and have the first magnetic poles, and second magnetic pole portions 61 that are core magnetic pole portions not including the permanent magnets 1B and have the second magnetic poles are arrayed alternately in the circumferential direction of the rotor 20B. In the consequent-pole-type rotor 20B, the number of poles is an even number of four or more.

The outer shape of the rotor core 5B is a so-called flower circle shape. The flower circle shape is a shape in which the outer diameter of the rotor core 5B is the maximum at pole centers 62 and 63 and is the minimum at inter-pole spaces 64, and is a shape forming arcs from the pole centers 62 and 63 to the inter-pole spaces 64. The pole centers 62 are pole centers of the first magnetic poles, and the pole centers 63 are pole centers of the second magnetic poles. In the illustrated example, the flower circle shape is a shape in which ten petals of the same shape and the same size are arranged at an equal angle. Therefore, the outer diameter of the rotor core 5B at the pole centers 62 is equal to the outer diameter of the rotor core 5B at the pole centers 63. The circumferential width of each magnet insertion hole 2B is larger than the pole pitch.

The rotor core 5B also has bridges 5B1 and bridges 5B2. Each bridge 5B1 is formed between the radially outer side of the second region 3B of the magnet insertion hole 2B and the outer peripheral surface 51 of the rotor core 5B, and each bridge 5B2 is formed between the second region 3B of the magnet insertion hole 2B and the second region 3B of the adjacent magnet insertion hole 2B.

In the consequent-pole-type rotor 20B thus configured, the respective magnetic poles on the outer side of adjacent permanent magnets 1B are an N pole and an N pole, and the circumferential width of the bridge 5B2 between the adjacent permanent magnets 1B is larger than the circumferential width of the bridge 4A2 formed in the rotor 20A illustrated in FIG. 8. Consequently, the distance between bridges 5B1 adjacent to each other through the bridge 5B2 is increased, and a path of leakage flux a leaking from one bridge 5B1 does not reach the adjacent other bridge 5B1, so that the leakage flux a passes through only the one bridge 5B1 and leaks to the S pole of the permanent magnet 1B.

That is, in the rotor core 5B, magnetic resistance imparted by the bridges 5B1 is smaller than magnetic resistance of a common IPM, and thus magnetic flux generated at the N pole of one permanent magnet 1B of adjacent permanent magnets 1B leaks to the S pole of the one permanent magnet 1B, forming a short loop of the magnetic flux, and thereby increasing leakage flux.

In addition, there is a limit to the reduction of the thickness of the bridges 5B1 for reasons of processing during the manufacturing of core segments constituting the rotor core 5B. Therefore, the smaller the size of the electric motor, the higher the ratio of the size of the bridges 5B1 to the size of the rotor and the size of the permanent magnets, and the larger the influence of the leakage flux a. When the leakage flux a increases, current for the electric motor to produce torque increases, resulting in a reduction in electric motor efficiency.

Figure 11:
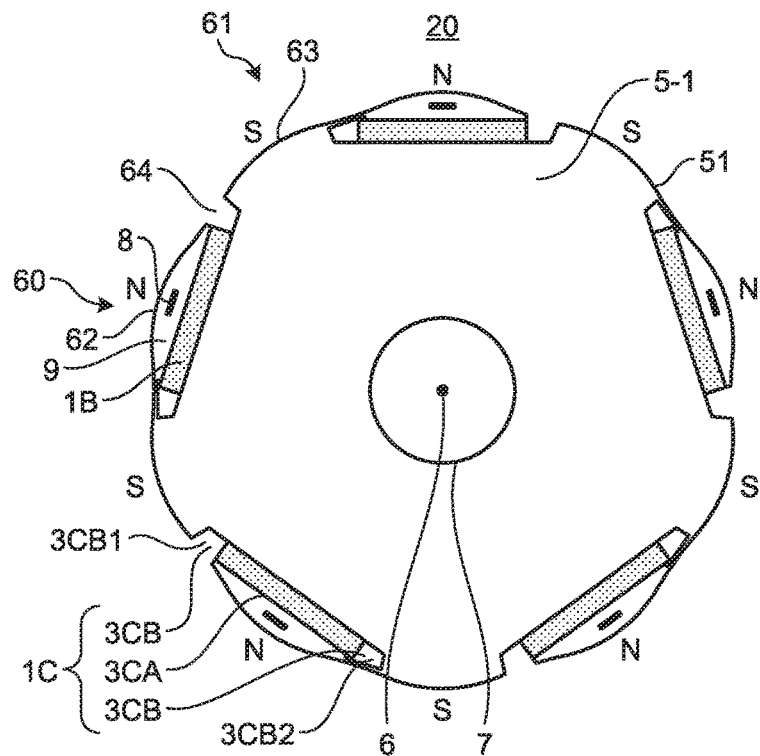
FIG. 11 is a first cross-sectional view of a consequent-pole-type rotor according to the first embodiment.
Figure 12:
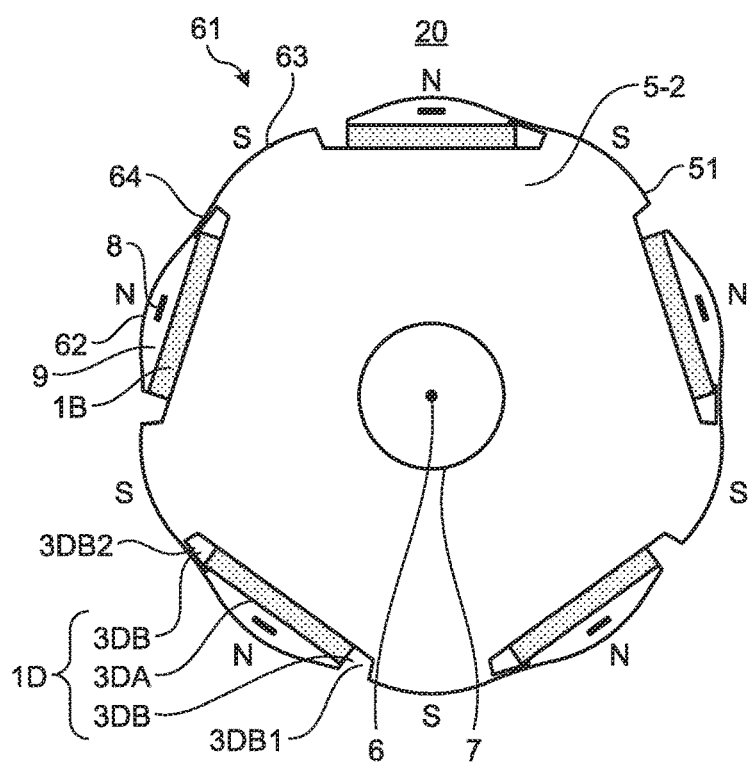
FIG. 12 is a second cross-sectional view of the consequent-pole-type rotor according to the first embodiment.
Figure 13:
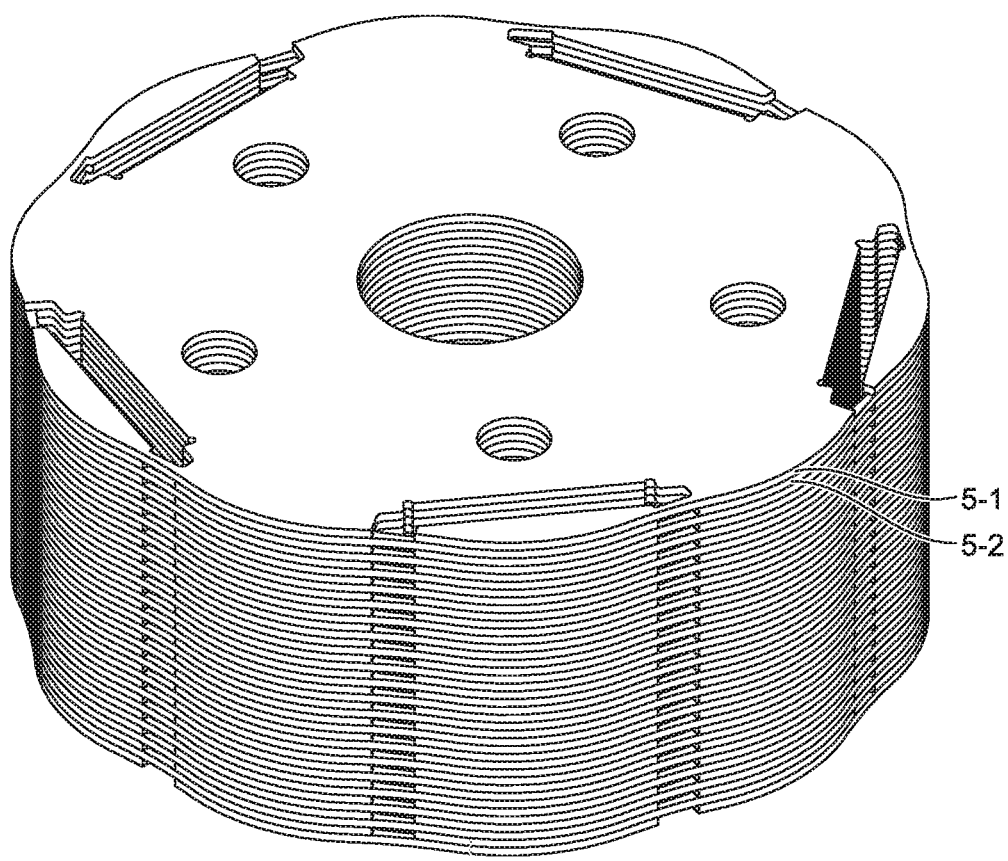
FIG. 13 is a perspective view of a rotor core formed by alternately stacking first rotor cores illustrated in FIG. 11 and second rotor cores illustrated in FIG. 12 in the axial direction.
Figure 14:
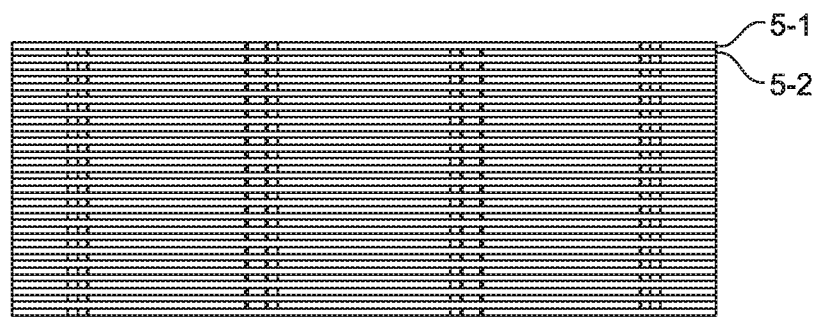
FIG. 14 is a side view of the rotor core illustrated in FIG. 13.
Figure 15:
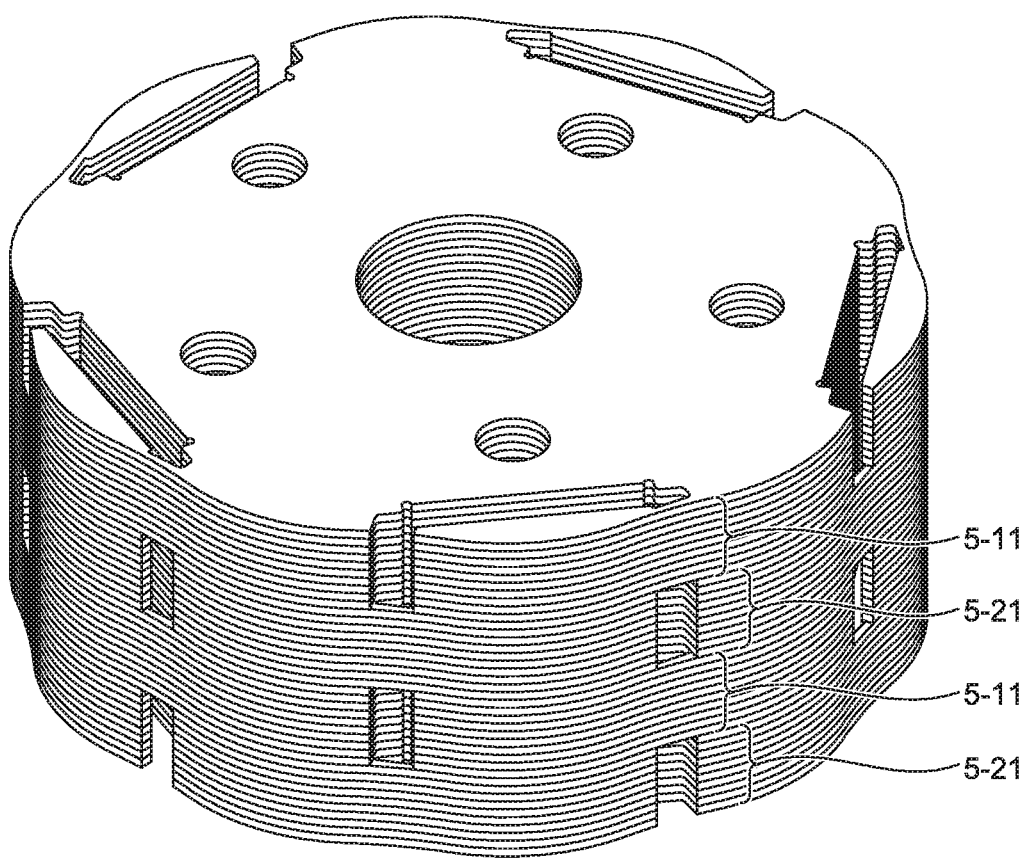
FIG. 15 is a perspective view of a rotor core formed by alternately stacking in the axial direction first rotor core blocks in each of which a plurality of first rotor cores illustrated in FIG. 11 is stacked in the axial direction, and second rotor core blocks in each of which a plurality of second rotor cores illustrated in FIG. 12 is stacked in the axial direction.
Figure 16:
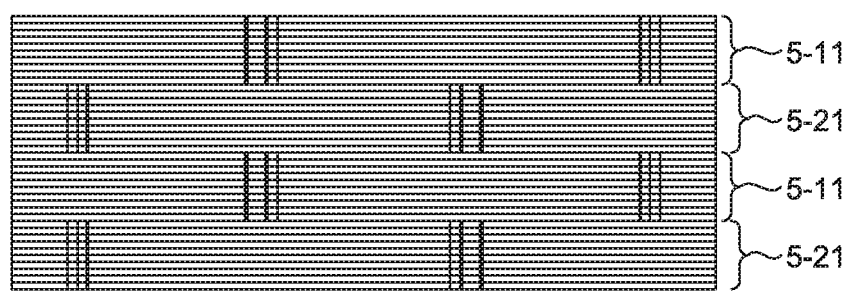
FIG. 16 is a side view of the rotor core illustrated in FIG. 15.
Figure 17:
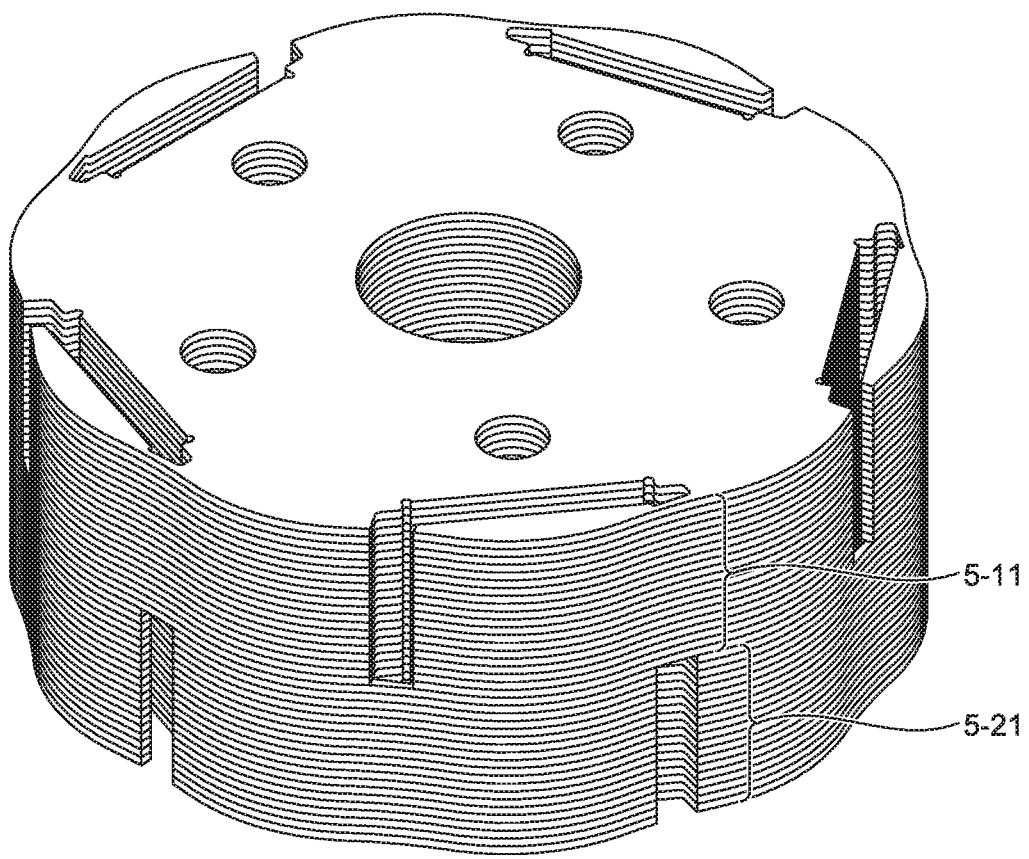
FIG. 17 is a perspective view of a rotor core formed by stacking in the axial direction a first rotor core block in which a plurality of first rotor cores illustrated in FIG. 11 is stacked in the axial direction, and a second rotor core block in which a plurality of second rotor cores illustrated in FIG. 12 is stacked in the axial direction.
Figure 18:
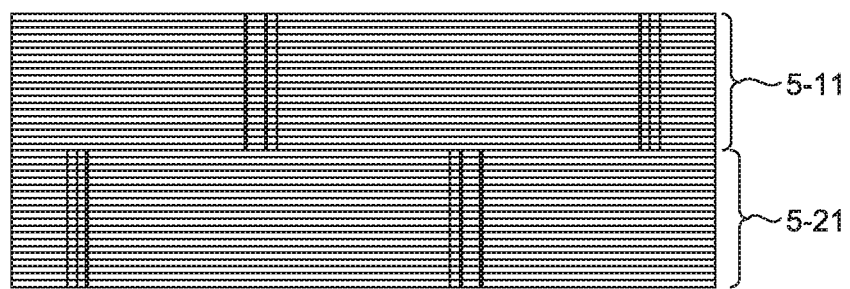
FIG. 18 is a side view of the rotor core illustrated in FIG. 17.

In order to solve such a problem, the rotor according to the present embodiment is configured as follows. FIG. 11 is a first cross-sectional view of a consequent-pole-type rotor according to the first embodiment. FIG. 12 is a second cross-sectional view of the consequent-pole-type rotor according to the first embodiment. FIG. 13 is a perspective view of a rotor core formed by alternately stacking first rotor cores illustrated in FIG. 11 and second rotor cores illustrated in FIG. 12 in the axial direction. FIG. 14 is a side view of the rotor core illustrated in FIG. 13. FIG. 15 is a perspective view of a rotor core formed by alternately stacking in the axial direction first rotor core blocks in each of which a plurality of first rotor cores illustrated in FIG. 11 is stacked in the axial direction, and second rotor core blocks in each of which a plurality of second rotor cores illustrated in FIG. 12 is stacked in the axial direction. FIG. 16 is a side view of the rotor core illustrated in FIG. 15. FIG. 17 is a perspective view of a rotor core formed by stacking in the axial direction a first rotor core block in which a plurality of first rotor cores illustrated in FIG. 11 is stacked in the axial direction, and a second rotor core block in which a plurality of second rotor cores illustrated in FIG. 12 is stacked in the axial direction. FIG. 18 is a side view of the rotor core illustrated in FIG. 17.

A rotor core 5 of the rotor 20 according to the present embodiment includes first rotor cores 5-1 and second rotor cores 5-2 stacked in the axial direction of the rotor core 5. FIG. 11 illustrates a cross-sectional view of each first rotor core 5-1. FIG. 12 illustrates a cross-sectional view of each second rotor core 5-2. Hereinafter, differences from the rotor 20B illustrated in FIG. 9 will be described, and the same reference numerals are assigned to the same components as those of the rotor 20B without detailed explanations.

Each first rotor core 5-1 has five magnet insertion holes 1C as first insertion holes arrayed in the circumferential direction, and caulking 8 formed in core portions between the radially outer side of the magnet insertion holes 1C and an outer peripheral surface 51 of the first rotor core 5-1. Each magnet insertion hole 1C of the first rotor core 5-1 is composed of a first region 3CA of a rectangular shape into which a permanent magnet 1B is inserted and two second regions 3CB into which the permanent magnet 1B is not inserted. The second regions 3CB are formed at longitudinal both ends of the first region 3CA, one at a place. The second regions 3CB have the function of flux barriers for suppressing leakage flux against the permanent magnet 1B inserted in the first region 3CA, and have the function of making magnetic flux density distribution over the outer peripheral surface 51 of the first rotor core 5-1 close to a sinusoidal wave to short-circuit magnetic flux of the permanent magnets 1B inserted in the adjacent magnet insertion holes 1C via the first rotor core 5-1.

One second region 3CB1 of the two second regions 3CB of each magnet insertion hole 1C of the first rotor core 5-1 is open to the outer peripheral surface 51 of the rotor core 5, and the other second region 3CB2 of the first rotor core 5-1 is not open to the outer peripheral surface 51 of the rotor core 5 but is closed in the circumferential direction. Since the second region 3CB1 is open to the outer peripheral surface 51 of the rotor core 5, the magnetic resistance of the second region 3CB1 is greater than the magnetic resistance of the closed second region 3CB2. Consequently, leakage flux can be reduced as compared with a rotor core with both of the two second regions closed.

Like the first rotor cores 5-1, each second rotor core 5-2 includes five magnet insertion holes 1D as second insertion holes arrayed in the circumferential direction, and caulking 8 formed in core portions between the radially outer side of the magnet insertion holes 1D and an outer peripheral surface 51 of the second rotor core 5-2. Each magnet insertion hole 1D of the second rotor core 5-2 is composed of a first region 3DA of a rectangular shape into which a permanent magnet 1B is inserted and two second regions 3DB into which the permanent magnet 1B is not inserted. The second regions 3DB are formed at longitudinal both ends of the first region 3DA, one at a place. The second regions 3DB have the function of flux barriers for suppressing leakage flux against the permanent magnet 1B inserted in the first region 3DA, and have the function of making magnetic flux density distribution over the outer peripheral surface 51 of the second rotor core 5-2 close to a sinusoidal wave to short-circuit magnetic flux of the permanent magnets 1B inserted in the adjacent magnet insertion holes 1D via the second rotor core 5-2.

One second region 3DB1 of the two second regions 3DB of each magnet insertion hole 1D of the second rotor core 5-2 is open to the outer peripheral surface 51 of the rotor core 5 but is closed in the circumferential direction, and the other second region 3DB2 is not open to the outer peripheral surface 51 of the rotor core 5 but is closed in the circumferential direction. Since the second region 3DB1 is open to the outer peripheral surface 51 of the rotor core 5, the magnetic resistance of the second region 3DB1 is greater than the magnetic resistance of the closed second region 3DB2. Consequently, leakage flux can be reduced as compared with a rotor core with both of the two second regions closed.

The rotor core 5 illustrated in FIGS. 13 and 14 is formed by alternately stacking the first rotor cores 5-1 and the second rotor cores 5-2 in the axial direction. The rotor core 5 illustrated in FIGS. 15 and 16 is formed by alternately stacking in the axial direction first rotor core blocks 5-11 in each of which a plurality of first rotor cores 5-1 illustrated in FIG. 11 is stacked in the axial direction, and second rotor core blocks 5-21 in each of which a plurality of second rotor cores 5-2 illustrated in FIG. 12 is stacked in the axial direction. The rotor core 5 illustrated in FIGS. 17 and 18 is formed by stacking a first rotor core block 5-11 and a second rotor core block 5-21 in the axial direction.

In the rotor core 5 according to the present embodiment, one of the two bridges 5B1 existing on both sides of each permanent magnet 1B illustrated in FIGS. 10 and 11 is eliminated, so that the rotor core 5 has a greater magnetic resistance than the rotor core 5 illustrated in FIG. 9.

Here, when both sides of the permanent magnet 1B are opened, it is impossible to support the radially outer side of the permanent magnet 1B, and it becomes impossible to hold the permanent magnet 1B. Thus, a fixing component including an adhesive is required. Even when one side of a magnet insertion hole is opened by using a fixing component, a bridge left on the other side of the magnet insertion hole functions as a holding portion of the permanent magnet 1B.

However, as the rotational speed of the rotor 20 increases, the moment of centrifugal force increases, so that the strength against the moment is insufficient only with the bridge on one side. In order to solve this insufficient strength, the rotor core 5 according to the present embodiment has the first rotor cores 5-1 with one side of each magnet insertion hole opened and the second rotor cores 5-2 with the other side of each magnet insertion hole opened alternately stacked. Specifically, when an area in which an opening of a magnet insertion hole is formed on the circumference of each first rotor core 5-1 is referred to as a first circumferential position, and an area coinciding with the first circumferential position on the circumference of the second rotor core 5-2 placed on the first rotor core 5-1 is referred to as a second circumferential position, no opening is formed at the second circumferential position. Consequently, there are positions where the opening areas of the first rotor cores 5-1 do not coincide with the opening areas of the second rotor cores 5-2, so that insufficient strength can be solved.

In the rotor core 5 according to the present embodiment, by providing the caulking 8 that fastens the plurality of cores stacked in the axial direction to each other, the plurality of core portions 9 are integrated, and centrifugal force due to rotation can be held outside the permanent magnets 1B.

The respective numbers of the first rotor cores 5-1 and the second rotor cores 5-2 stacked may be one, or may be two or more, and are determined suitably according to strength required of the rotor core 5 and the productivity of the rotor core 5.

When the strength is insufficient even with the provision of the caulking 8, the rotor core 5 according to the present embodiment is formed by stacking in the axial direction of the rotor core 5 the first rotor cores 5-1, the second rotor cores 5-2, and one or more third cores not having an opening. Although the strength is increased by this configuration, leakage flux increases as the ratio of the third cores increases. Therefore, the number of the third cores inserted is determined in consideration of centrifugal force strength and the influence of leakage flux.

Although the outer peripheral surface 51 of the rotor core 5 has the flower circle shape, this shape makes it difficult to assemble the electric motor. In addition, the flower circle shape complicates a jig structure for accurately inserting the rotor into the stator. Also, in checking the gap between the stator and the rotor with a gap gauge, the position of the rotor must be changed while checking because air gap changes depending on how slot openings of the stator core face projected portions and recessed portions of the flower circle shape. Therefore, from a production viewpoint, the outer diameter of the rotor is preferably close to a perfect circle.

Thus, in the rotor core 5 according to the present embodiment, the recessed portions of the flower circle of the outer peripheral surface 51 of the rotor core 5 are covered with resin, the second regions of the magnet insertion holes are covered with resin, and the openings of the second regions of the magnet insertion holes are covered with resin.

Figure 19:
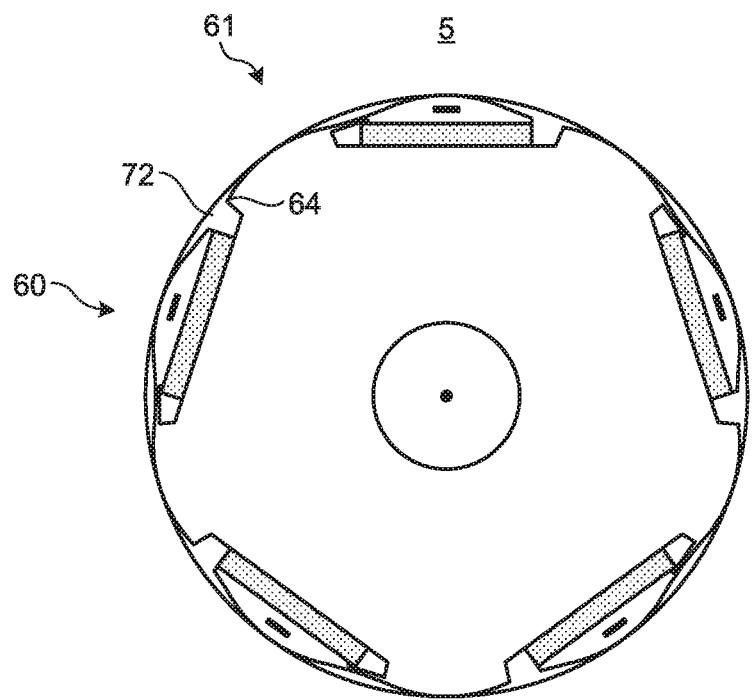
FIG. 19 is a diagram illustrating a state where resin is applied to the rotor core illustrated in FIG. 13, 15, or 17.
Figure 20:
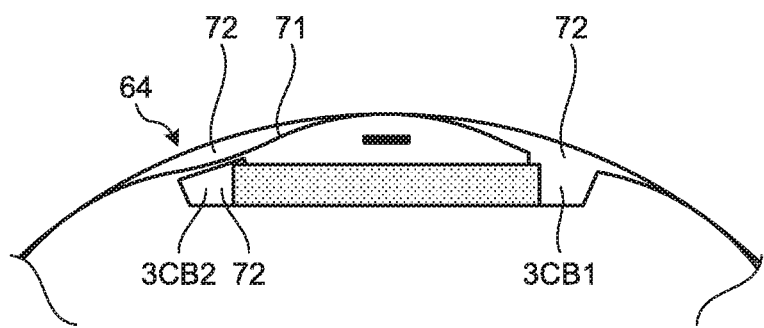
FIG. 20 is a partially enlarged view of the rotor core illustrated in FIG. 19.

FIG. 19 is a diagram illustrating a state where resin is applied to the rotor core illustrated in FIG. 13, 15, or 17. FIG. 20 is a partially enlarged view of the rotor core illustrated in FIG. 19. As illustrated in FIGS. 19 and 20, of the outer peripheral surface 71 of the rotor core 5, the inter-pole spaces 64 between the first magnetic pole portions 60 and the second magnetic pole portions 61 are covered with resin 72, and the second regions 3CB2 of the magnet insertion holes are covered with the resin 72. Also, the second regions 3CB1 are covered with the resin 72. The second regions 3DB2 illustrated in FIG. 12 are covered with the resin 72, and the second regions 3DB1 are covered with the resin 72, which are not illustrated.

This facilitates the assembly of the electric motor, and also improves the strength against centrifugal force due to the rotation of the rotor. It is also possible to prevent the permanent magnets from moving inside the magnet insertion holes due to stator current. If the permanent magnets move inside the magnet insertion holes, sound of the permanent magnets colliding with walls of the magnet insertion holes is generated, and the positions of the permanent magnets change, so that magnetic balance is changed and vibration and noise of the rotor are generated, which can be prevented. The outer peripheral surface of the rotor core covered with the resin is circular. This facilitates the assemblage of the electric motor, and improves production efficiency.

Second Embodiment

Figure 21:
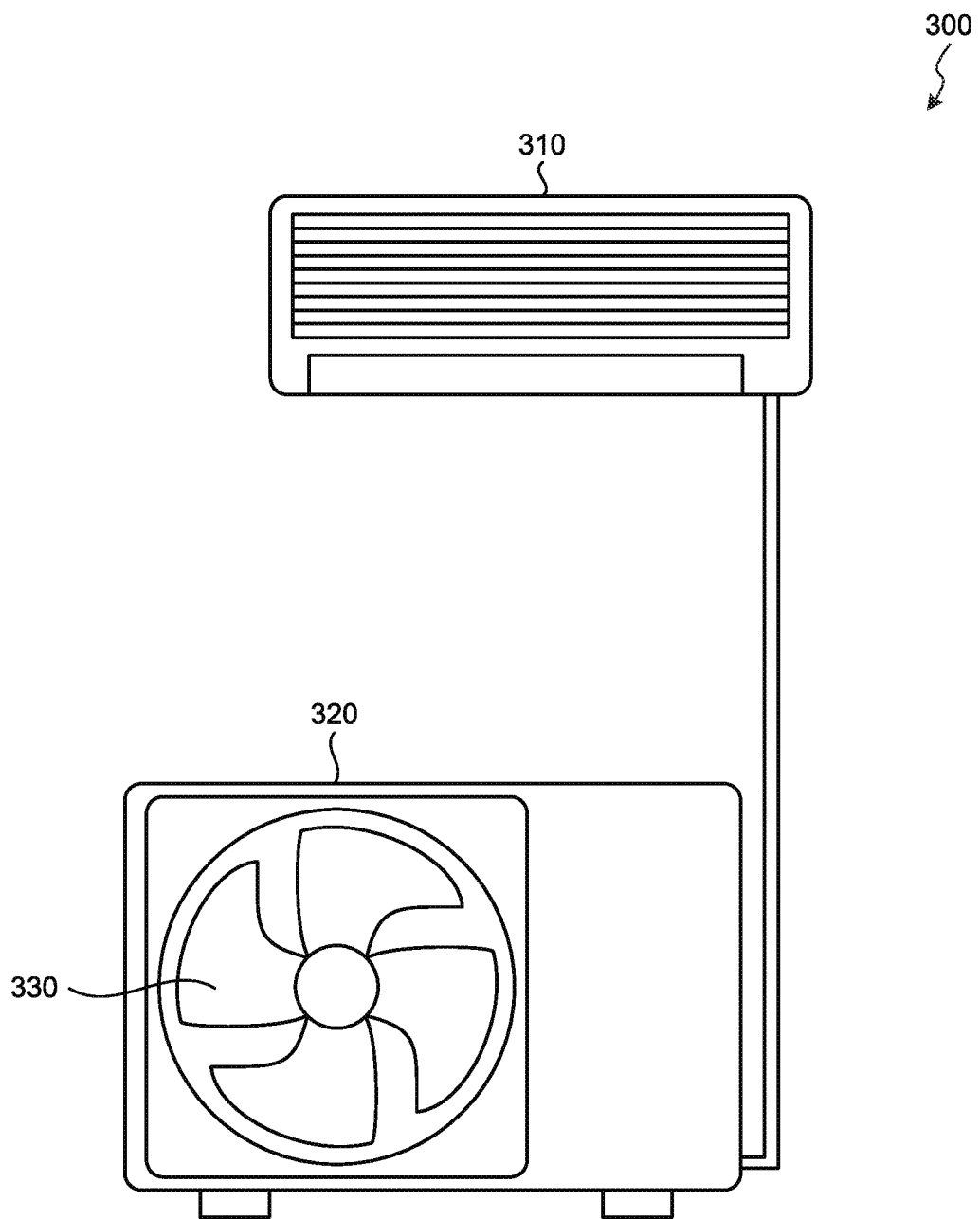
FIG. 21 is a diagram illustrating an example of the configuration of an air conditioner according to a second embodiment.

FIG. 21 is a diagram illustrating an example of the configuration of an air conditioner according to a second embodiment. An air conditioner 300 includes an indoor unit 310 and an outdoor unit 320 connected to the indoor unit 310. An indoor unit blower not illustrated is mounted in the indoor unit 310, and an outdoor unit blower 330 is mounted in the outdoor unit 320. A compressor not illustrated is mounted in the outdoor unit 320. For the blowers and the compressor, the electric motor 100 according to the first embodiment is used.

In this way, by using the electric motor 100 according to the first embodiment as a driving source of the blowers and the compressor of the air conditioner 300, the air conditioner 300 can be reduced in cost, vibration, and noise.

Note that the electric motor 100 according to the first embodiment can be mounted in an electric apparatus other than the air conditioner, and also in this case, can provide the same effects as in the present embodiment.

The configurations illustrated in the above embodiments illustrate an example of the subject matter of the present invention, and can be combined with another known art, and can be partly omitted or changed without departing from the scope of the present invention.

The invention claimed is:

1. A consequent-pole-type rotor comprising:
a first rotor core having a first insertion hole; and
a second rotor core having a second insertion hole, the second rotor core being stacked on the first rotor core such that the first insertion hole and the second insertion hole together form a space accommodating a permanent magnet,
wherein the first insertion hole has an opening at a first circumferential position of the first rotor core, the opening being kept open without being filled up with any portion of the first rotor core,
the second insertion hole is occluded at least at a second circumferential position of the second rotor core,
the second circumferential position corresponds to the first circumferential position, and
first rotor core blocks in each of which a plurality of the first rotor cores is stacked in an axial direction, and second rotor core blocks in each of which a plurality of the second rotor cores is stacked in the axial directions are alternately stacked in the axial direction.

2. The consequent-pole-type rotor according to claim 1, wherein the first rotor core and the second rotor core comprise caulking formed in a core portion between a radially outer side of the permanent magnet and an outer peripheral surface of the first rotor core and the second rotor core.

3. The consequent-pole-type rotor according to claim 1, wherein the opening, the first insertion hole, and the second insertion hole are covered with resin.

4. The consequent-pole-type rotor according to claim 1, wherein the outer peripheral surface of the first rotor core and the second rotor core covered with resin is circular.

5. The consequent-pole-type rotor according to claim 1, wherein the first rotor core and the second rotor core are formed by stacking, in an axial direction of the first rotor core and the second rotor core, the first rotor core, the second rotor core, and a third core not having the opening.

6. An electric motor comprising the consequent-pole-type rotor according to claim 1 and a stator.

7. An air conditioner comprising the electric motor according to claim 6.

* * * * *